(12) United States Patent
Shafiee Ardestani et al.

(10) Patent No.: US 12,229,659 B2
(45) Date of Patent: Feb. 18, 2025

(54) PROCESSOR WITH OUTLIER ACCOMMODATION

(71) Applicant: Samsung Electronics Co., Ltd., Suwon-si (KR)

(72) Inventors: Ali Shafiee Ardestani, Santa Clara, CA (US); Joseph Hassoun, Los Gatos, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1113 days.

(21) Appl. No.: 17/110,266

(22) Filed: Dec. 2, 2020

(65) Prior Publication Data

US 2022/0114425 A1   Apr. 14, 2022

Related U.S. Application Data

(60) Provisional application No. 63/089,374, filed on Oct. 8, 2020.

(51) Int. Cl.
| | | |
|---|---|---|
| *G06N 3/063* | (2023.01) | |
| *G06F 7/50* | (2006.01) | |
| *G06F 7/523* | (2006.01) | |
| *G06F 7/53* | (2006.01) | |
| *G06F 7/544* | (2006.01) | |

(52) U.S. Cl.
CPC ............. *G06N 3/063* (2013.01); *G06F 7/50* (2013.01); *G06F 7/523* (2013.01); *G06F 7/5324* (2013.01); *G06F 7/5443* (2013.01)

(58) Field of Classification Search
CPC .................................................. G06F 7/5324
See application file for complete search history.

(56) References Cited

U.S. PATENT DOCUMENTS

| | | |
|---|---|---|
| 7,428,566 B2 | 9/2008 | Siu et al. |
| 8,533,656 B1 | 9/2013 | Nnaji |
| 9,818,059 B1 | 11/2017 | Woo et al. |
| 9,935,650 B2 | 4/2018 | Dickie |
| 10,769,526 B2 | 9/2020 | Daga et al. |
| 2017/0316311 A1 | 11/2017 | Pilly et al. |

(Continued)

OTHER PUBLICATIONS

Judd, P. et al., "Stripes: Bit-Serial Deep Neural Network Computing", 2016, 12 pages, IEEE.

(Continued)

*Primary Examiner* — Michael D. Yaary
(74) *Attorney, Agent, or Firm* — Womble Bond Dickinson

(57) ABSTRACT

A system and method for performing sets of multiplications in a manner that accommodates outlier values. In some embodiments the method includes: forming a first set of products, each product of the first set of products being a product of a first activation value and a respective weight of a first plurality of weights. The forming of the first set of products may include multiplying, in a first multiplier, the first activation value and a least significant sub-word of a first weight to form a first partial product; multiplying, in a second multiplier, the first activation value and a least significant sub-word of a second weight; multiplying, in a third multiplier, the first activation value and a most significant sub-word of the first weight to form a second partial product; and adding the first partial product and the second partial product.

20 Claims, 5 Drawing Sheets

(56) References Cited

U.S. PATENT DOCUMENTS

| | | | |
|---|---|---|---|
| 2019/0042198 A1 | 2/2019 | Langhammer et al. | |
| 2019/0065150 A1 | 2/2019 | Heddes et al. | |
| 2019/0171927 A1 | 6/2019 | Diril et al. | |
| 2019/0228293 A1 | 7/2019 | Imber et al. | |
| 2020/0034148 A1 | 1/2020 | Sumbul et al. | |
| 2020/0051309 A1 | 2/2020 | Labbe et al. | |
| 2020/0057934 A1 | 2/2020 | Yoo et al. | |
| 2020/0117453 A1 | 4/2020 | Zhang et al. | |
| 2020/0158514 A1 | 5/2020 | Moloney et al. | |
| 2020/0160112 A1 | 5/2020 | Dennison et al. | |
| 2020/0210839 A1 | 7/2020 | Lo et al. | |
| 2020/0226444 A1 | 7/2020 | Sharma et al. | |
| 2020/0264876 A1 | 8/2020 | Lo et al. | |
| 2020/0285949 A1 | 9/2020 | Baum et al. | |
| 2020/0310758 A1* | 10/2020 | Desoli | G06N 3/063 |
| 2020/0320375 A1 | 10/2020 | Abuhatzera et al. | |
| 2020/0349106 A1 | 11/2020 | Ovsiannikov | |
| 2020/0349420 A1 | 11/2020 | Ovsiannikov et al. | |
| 2022/0147312 A1 | 5/2022 | Shafiee Ardestani et al. | |

OTHER PUBLICATIONS

U.S. Final Rejection for U.S. Appl. No. 17/131,357 dated Jun. 27, 2023, 10 pages.

U.S. Final Rejection for U.S. Appl. No. 17/133,288 dated Jun. 27, 2023, 12 pages.

Lanuzza et al., "Cost-Effective Low-Power Processor-In-Memory-based Reconfigurable Datapath for Multimedia Applications", Proceedings of the 2005 International Symposium on Low Power Electronics and Design, Aug. 8, 2005. (Year: 2005).

U.S. Office Action dated Dec. 29, 2022, issued in U.S. Appl. No. 17/131,357 (53 pages).

U.S. Office Action dated Dec. 30, 2022, issued in U.S. Appl. No. 17/133,288 (67 pages).

"NVIDIA Deep Learning Accelerator", 4 pages, retrieved from URL: http://nvdla.org on Dec. 22, 2020.

Unpublished U.S. Appl. No. 17/131,357, filed Dec. 22, 2020.

Unpublished U.S. Appl. No. 17/133,288, filed Dec. 23, 2020.

Chen, Y. et al., "A Survey of Accelerator Architectures for Deep Neural Networks", Engineering, Jan. 29, 2020, pp. 264-274, Elsevier Ltd.

Park, E. et al., "Energy-efficient Neural Network Accelerator Based on Outlier-aware Low-precision Computation, 2018 ACM/IEEE 45th Annual International Symposium on Computer Architecture", IEEE Computer Society, 2018, pp. 688-698, IEEE.

Zhao, R. et al., "Overwrite Quantization: Opportunistic Outlier Handling for Neural Network Accelerators", Oct. 13, 2019, 9 pages, arXiv:1910.06909v1.

* cited by examiner the first multiplier, the first activation value and the least significant sub-word of the first weight of the second plurality of weights to form a third partial product; multiplying, in the second multiplier, the second activation value and the least significant sub-word of a second weight of the second plurality of weights to form a fourth partial product; multiplying, in the third multiplier, the first activation value and the first nonzero value to form a fifth partial product; adding the third partial product and the fifth partial product; and adding the fourth partial product and the fifth partial product.

PROCESSOR WITH OUTLIER ACCOMMODATION

CROSS-REFERENCE TO RELATED APPLICATION(S)

The present application claims priority to and the benefit of U.S. Provisional Application No. 63/089,374, filed Oct. 8, 2020, entitled "IMPROVING AREA AND POWER EFFICIENCY USING OUTLIER VALUES", the entire content of which is incorporated herein by reference.

FIELD

One or more aspects of embodiments according to the present disclosure relate to processing circuits, and more particularly to a system and method for performing sets of multiplications in a manner that accommodates outlier values.

BACKGROUND

Processors for neural networks may perform large volumes of multiplication and addition operations, some of which may be a poor use of processing resources because a significant fraction of the numbers being processed may be relatively small, and only a small fraction of outliers may be relatively large.

Thus, there is a need for a system and method for performing sets of multiplications in a manner that accommodates outlier values

SUMMARY

According to an embodiment of the present invention, there is provided a method, including: forming a first set of products, each product of the first set of products being a product of a first activation value and a respective weight of a first plurality of weights, each of the weights of the first plurality of weights including a least significant sub-word and a most significant sub-word; the most significant sub-word of a first weight of the first plurality of weights being nonzero, the most significant sub-word of a second weight of the first plurality of weights being zero, the forming of the first set of products including: multiplying, in a first multiplier, the first activation value and the least significant sub-word of the first weight to form a first partial product; multiplying, in a second multiplier, the first activation value and the least significant sub-word of the second weight; multiplying, in a third multiplier, the first activation value and the most significant sub-word of the first weight to form a second partial product; and adding the first partial product and the second partial product.

In some embodiments, the adding of the first partial product and the second partial product includes performing an offset addition of the first partial product and the second partial product.

In some embodiments: the most significant sub-word of a third weight of the first plurality of weights is equal to the most significant sub-word of the first weight; and the forming of the first set of products further includes: multiplying, in a fourth multiplier, the first activation value and the least significant sub-word of the third weight to form a third partial product; and adding the third partial product and the second partial product.

In some embodiments: the adding of the first partial product and the second partial product includes adding the first partial product and the second partial product in response to a first bit of an index word, for the first plurality of weights, being set; the first bit corresponds to the first weight; the adding the third partial product and the second partial product includes adding the third partial product and the second partial product in response to a second bit of the index word being set; and the second bit corresponds to the third weight.

In some embodiments, the method further includes forming a second set of products, each product of the second set of products being a product of a second activation value and a second plurality of weights, each of the weights of the second plurality of weights including a least significant sub-word and a most significant sub-word; the most significant sub-word of each of the second plurality of weights being equal to a first nonzero value, the forming of the second set of products including: multiplying, in the first multiplier, the second activation value and the least significant sub-word of a first weight of the second plurality of weights to form a third partial product; multiplying, in the second multiplier, the second activation value and the least significant sub-word of a second weight of the second plurality of weights to form a fourth partial product; multiplying, in the third multiplier, the first activation value and the first nonzero value to form a fifth partial product; adding the third partial product and the fifth partial product; and adding the fourth partial product and the fifth partial product.

In some embodiments, the method further includes: determining that a first dense format flag, for the first plurality of weights, is not set, wherein the forming of the first set of products includes forming the first set of products in response to the first dense format flag being not set.

In some embodiments, the method further includes determining that a second dense format flag, for a second plurality of weights, is set, and in response to the second dense format flag being set, forming a second set of products, each product of the second set of products being a product of a second activation value and a respective weight of the second plurality of weights, each of the weights of the second plurality of weights including a least significant sub-word and a most significant sub-word, the forming of the second set of products including: multiplying, in the first multiplier, the second activation value and the least significant sub-word of a first weight of the second plurality of weights to form a third partial product; multiplying, in the first multiplier, the second activation value and the most significant sub-word of the first weight of the second plurality of weights to form a fourth partial product; and adding the third partial product and the fourth partial product.

In some embodiments: the least significant sub-word of the first weight consists of four bits, and the most significant sub-word of the first weight consists of four bits.

In some embodiments, the first multiplier is a four bit by four bit multiplier.

According to an embodiment of the present invention, there is provided a system, including: a processing circuit including: a first multiplier, a second multiplier, and a third multiplier, the processing circuit being configured to form a first set of products, each product of the first set of products being a product of a first activation value and a respective weight of a first plurality of weights, each of the weights of the first plurality of weights including a least significant sub-word and a most significant sub-word; the most significant sub-word of a first weight of the first plurality of weights being nonzero, the most significant sub-word of a second weight of the first plurality of weights being zero, the forming of the first set of products including: multiplying, in the first multiplier, the first activation value and the least significant sub-word of the first weight to form a first partial product; multiplying, in the second multiplier, the first activation value and the least significant sub-word of the second weight; multiplying, in the third multiplier, the first activation value and the most significant sub-word of the first weight to form a second partial product; and adding the first partial product and the second partial product.

In some embodiments, the adding of the first partial product and the second partial product includes performing an offset addition of the first partial product and the second partial product.

In some embodiments: the most significant sub-word of a third weight of the first plurality of weights is equal to the most significant sub-word of the first weight; and the forming of the first set of products further includes: multiplying, in a fourth multiplier, the first activation value and the least significant sub-word of the third weight to form a third partial product; and adding the third partial product and the second partial product.

In some embodiments: the adding of the first partial product and the second partial product includes adding the first partial product and the second partial product in response to a first bit of an index word, for the first plurality of weights, being set; the first bit corresponds to the first weight; the adding the third partial product and the second partial product includes adding the third partial product and the second partial product in response to a second bit of the index word being set; and the second bit corresponds to the third weight.

In some embodiments, the processing circuit is further configured to form a second set of products, each product of the second set of products being a product of a second activation value and a second plurality of weights, each of the weights of the second plurality of weights including a least significant sub-word and a most significant sub-word; the most significant sub-word of each of the second plurality of weights being equal to a first nonzero value, the forming of the second set of products including: multiplying, in the first multiplier, the second activation value and the least significant sub-word of a first weight of the second plurality of weights to form a third partial product; multiplying, in the second multiplier, the second activation value and the least significant sub-word of a second weight of the second plurality of weights to form a fourth partial product; multiplying, in the third multiplier, the first activation value and the first nonzero value to form a fifth partial product; adding the third partial product and the fifth partial product; and adding the fourth partial product and the fifth partial product.

In some embodiments, the processing circuit is further configured to: determine that a first dense format flag, for the first plurality of weights, is not set, wherein the forming of the first set of products includes forming the first set of products in response to the first dense format flag being not set.

In some embodiments, the processing circuit is further configured to determine that a second dense format flag, for a second plurality of weights, is set, and in response to the second dense format flag being set, form a second set of products, each product of the second set of products being a product of a second activation value and a respective weight of the second plurality of weights, each of the weights of the second plurality of weights including a least significant sub-word and a most significant sub-word, the forming of the second set of products including: multiplying, in the first multiplier, the second activation value and the least significant sub-word of a first weight of the second plurality of weights to form a third partial product; multiplying, in the first multiplier, the second activation value and the most significant sub-word of the first weight of the second plurality of weights to form a fourth partial product; and adding the third partial product and the fourth partial product.

In some embodiments: the least significant sub-word of the first weight consists of four bits, and the most significant sub-word of the first weight consists of four bits.

In some embodiments, the first multiplier is a four bit by four bit multiplier.

According to an embodiment of the present invention, there is provided a system, including: means for processing, including: a first multiplier, a second multiplier, and a third multiplier, the means for processing being configured to form a first set of products, each product of the first set of products being a product of a first activation value and a respective weight of a first plurality of weights, each of the weights of the first plurality of weights including a least significant sub-word and a most significant sub-word; the most significant sub-word of a first weight of the first plurality of weights being nonzero, the most significant sub-word of a second weight of the first plurality of weights being zero, the forming of the first set of products including: multiplying, in the first multiplier, the first activation value and the least significant sub-word of the first weight to form a first partial product; multiplying, in the second multiplier, the first activation value and the least significant sub-word of the second weight; multiplying, in the third multiplier, the first activation value and the most significant sub-word of the first weight to form a second partial product; and adding the first partial product and the second partial product.

In some embodiments, the adding of the first partial product and the second partial product includes performing an offset addition of the first partial product and the second partial product.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for performing sets of multiplications in a manner that accommodates outlier values provided in accordance with the present disclosure and is not intended to represent the only forms in which the present disclosure may be constructed or utilized.

The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
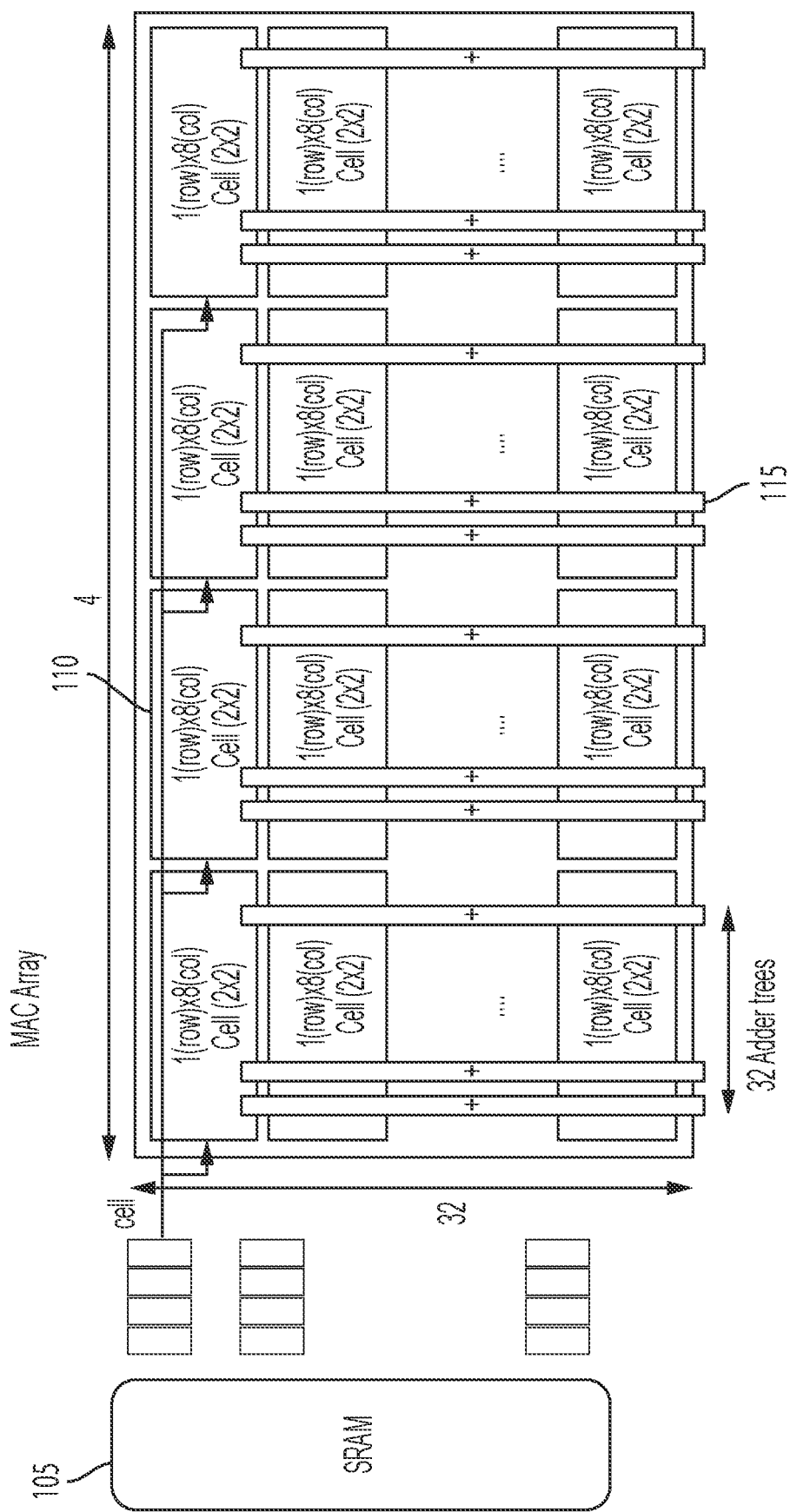
FIG. 1 is a block diagram of a portion of a neural network processor, according to an embodiment of the present disclosure.

A neural network (e.g., when performing inference) may perform voluminous calculations in which activations (the elements of an input feature map (IFM)) are multiplied by weights. The products of the activations and weights and may form multi-dimensional arrays which may be summed along one or more axes to form an array, or "tensor", that may be referred to as an output feature map (OFM). Referring to FIG. 1, special-purpose hardware may be employed to perform such calculations. Activations may be stored in a static random access memory (SRAM) 105 and fed into a multiplier accumulator (MAC) array, which may include (i) a plurality of blocks (which may be referred to as "bricks" 110), each of which may include a plurality of multipliers for multiplying activations and weights, (ii) one or more adder trees for adding together products generated by the bricks, and (iii) one or more accumulators for accumulating sums generated by the adder trees. Each activation value may be broadcast to a plurality of multipliers conceptually arranged in a row in the representation of FIG. 1. A plurality of adder trees 115 may be employed to form sums.

In operation, it may be that the weights fall within a range of values, and that the distribution of the values of the weights is such that relatively small weights are significantly more common than relatively large weights. For example, if each weight is represented as an 8-bit number, it may be that many of the weights (e.g., a majority of the weights, or more than ¾ of the weights) have a value of less than 16 (i.e., the most significant nibble is zero); the weights with nonzero most significant nibbles may then be referred to as "outliers". In some embodiments, suitably constructed hardware may achieve improved speed and power efficiency by taking advantage of these characteristics of the weights.

Figure 2A:
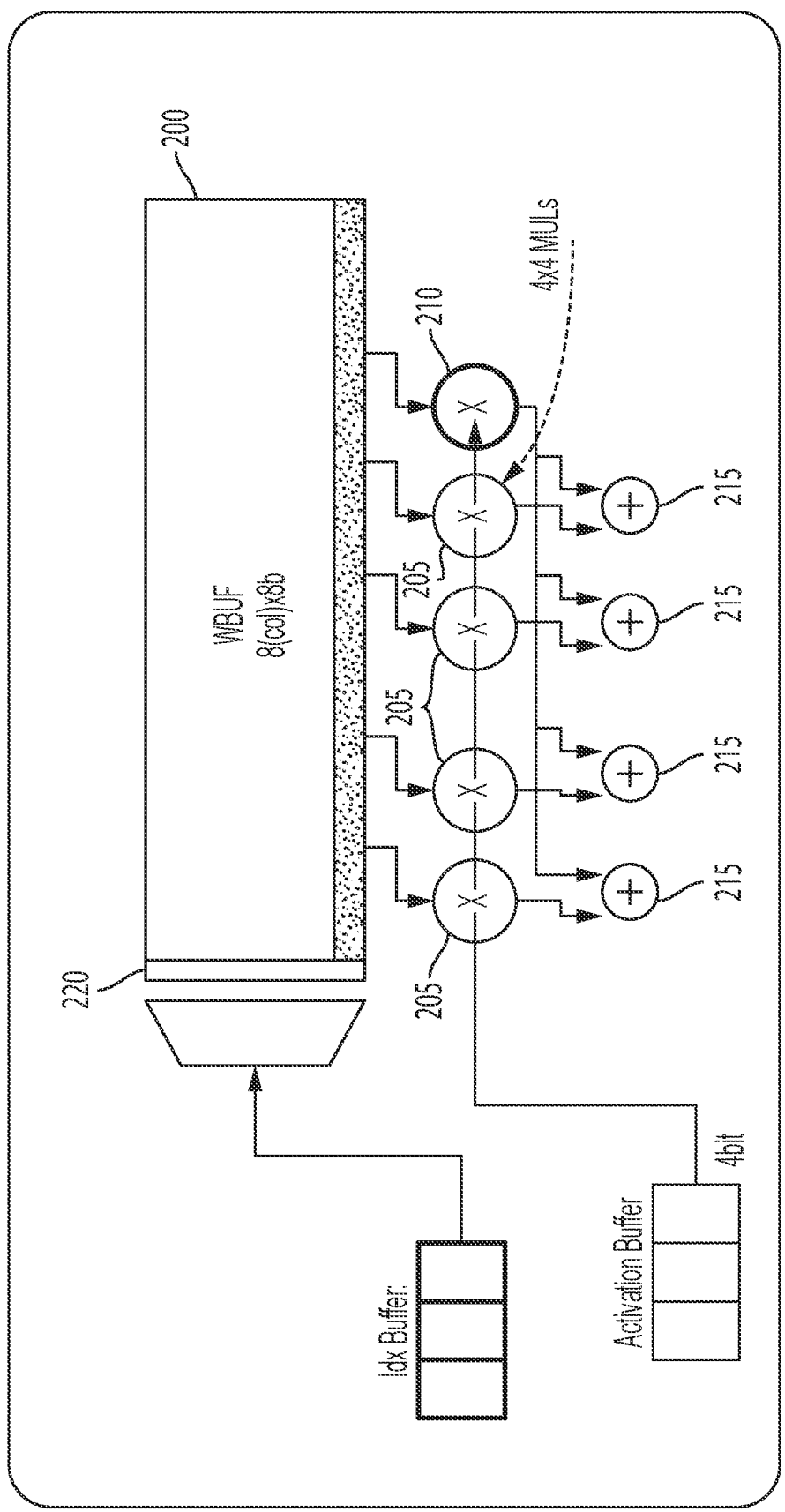
FIG. 2A is a block diagram of a portion of a neural network processor, according to an embodiment of the present disclosure.
Figure 2B:
FIG. 2B is a data format diagram, according to an embodiment of the present disclosure.
Figure 2C:
FIG. 2C is a data format diagram, according to an embodiment of the present disclosure.

For example, referring to FIG. 2A, in some embodiments, sets of weights are stored in respective rows of a weight buffer 200 in one of two formats, a dense format (FIG. 2B), and an outlier format (FIG. 2C). In the dense format, each row of the weight buffer 200 includes the least significant nibbles and the most significant nibble of each of eight weights (e.g. it may contain the eight least significant nibbles, followed by the eight most significant nibbles, as shown). The circuit of FIG. 2A includes nine multipliers, eight of which may be referred to as "standard" multipliers 205 (of which only four are shown, for ease of illustration) and one of which may be referred to as an "outlier" multiplier 210, the difference between the standard multipliers 205 and the outlier multiplier 210 being in the manner they are used in operation.

The multipliers 205, 210 may be 4×4 multipliers (as in the embodiment of FIGS. 2A and 3A), if each activation value is an 8-bit value, broadcast to the multipliers 205, 210 one nibble at a time, and the multipliers 205, 210 may be 8×4 multipliers, if each activation value is an 8-bit value, broadcast to the multipliers 205, 210 one byte at a time. An additional bit in each row of the weight buffer 200 may be a "dense format flag" which indicates, when set, that the weights in the same row are in dense format, and, when not set, that the weights in the same row are in outlier format. As used herein, when the dense format flag is "set" it means that the dense format flag has a value that indicates that the weights in the same row are in dense format; this may correspond to the dense format flag having a value of zero or to the dense format flag having a value of one, depending on the construction of the circuit. The weight buffer 200 may be considered, conceptually, to include (i) eight 8-bit wide columns (so that eight weights may be processed at a time (in one clock cycle in outlier mode, or in two clock cycles in dense mode, as discussed below)), and (ii) a 1-bit wide dense format flag column 220, that stores the dense format flag for each set of eight weights.

In dense mode (i.e., when the set of weights being processed is stored in the dense format), each of the standard multipliers 205 may multiply the current activation value by a first nibble of a respective weight during a first clock cycle, and by a second nibble of the weight during a second clock cycle. For example, during the first clock cycle, the activation value may be multiplied, in the eight respective standard multipliers 205, with the eight least significant nibbles of the eight weights in the current row of the weight buffer 200, to form a first set of eight partial products and during the second clock cycle, the activation value may be multiplied, in the eight respective standard multipliers 205, with the eight most significant nibbles, to form a second set of partial products. Each partial product of the first set of partial products may then be added to the corresponding partial product of the second set of partial products (and, possibly, to other partial products, e.g., in the adder tree).

Outlier mode may be capable of processing a set of weights (e.g., a set of eight weights, in the embodiment of FIG. 2A) in a single clock cycle. This mode may be used when the most significant nibbles of the weights satisfy certain constraints, e.g., when (i) all of the most significant nibbles are zero, or when (ii) one or more of the most significant nibbles are nonzero and all of the nonzero most significant nibbles have the same value. In outlier mode (i.e., when the set of weights is stored in the outlier format), the activation value may be multiplied with the eight least significant nibbles in the eight respective standard multipliers 205, to form first set of partial products, and the activation value may be multiplied with the value of the nonzero most significant nibble in the outlier multiplier 210, to form a second partial product. Each product may then be calculated as (i) the respective first partial product, for any weight having a zero most significant nibble, and (ii) the appropriate offset sum (calculated by the corresponding adder 215 of a plurality of adders 215) of the respective first partial product and the second partial product, for any weight having a nonzero most significant nibble. As used herein, an "offset sum" of two values is the result of "offset addition", which is the forming of the sum of (i) a first one of the two values and (ii) the second one of the two values, shifted to the left by a number of bits (e.g., by four bits). In the embodiment of FIG. 2A, the circuit includes an index buffer (or "Idx Buffer") for storing indices into the weight buffer. When an activation value in the input feature map is zero, it may be skipped, i.e., not placed in the activation buffer, and the value in the index buffer may accordingly advance to the next index (skipping the weights that would have been multiplied by the zero-valued activation, were it present in the activation buffer).

As mentioned above, FIG. 2B shows the data format used to store weights in the dense format in a row of the weight buffer 200, in some embodiments. The row contains the least significant nibble of each weight (labeled "LSN0", "LSN1", and so forth) and the most significant nibble of each weight (labeled "MSN0", "MSN1", and so forth), for a total of 64 bits. As mentioned above, a dense format flag (not shown)

may also be present in the row. FIG. 2C shows the data format used to store weights in the outlier format in a row of the weight buffer 200, in some embodiments. The row contains the least significant nibble of each weight (labeled "LSN0", "LSN1", and so forth) and the value of the most significant nibble (labeled "MSN") for all of the weights that have a nonzero most significant nibble (in outlier format, the value of the most significant nibble must be the same for all such weights). An index word includes an "outlier" bit for each of the weights, the outlier bit of each weight indicating (e.g., with a value of one) that the weight has a nonzero most significant nibble, or (e.g., with a value of zero) that the weight has a zero most significant nibble. The value of the outlier bit for each weight may determine whether or not the second partial product is added to the respective first partial product calculated for the weight. If all of the weights have a zero most significant nibble, the value of the most significant nibble field of the outlier format may be zero; and the values of the bits of the index word have no effect on the products that are calculated. In some embodiments, the outlier format may accommodate a set of weights having two different non-zero most significant nibble values by storing the two non-zero most significant nibbles in the row, along with two index words, one corresponding to the first most significant nibble value and the other corresponding to the second most significant nibble value. In such an embodiment, additional logic (including an additional outlier multiplier) may be present to form, and add, the partial product with the second most significant nibble. In some embodiments, N standard multipliers 205 and M outlier multipliers 210 may be present, with N>M, and the outlier format may be defined accordingly, to accommodate M different values of the most significant nibble.

Figure 3A:
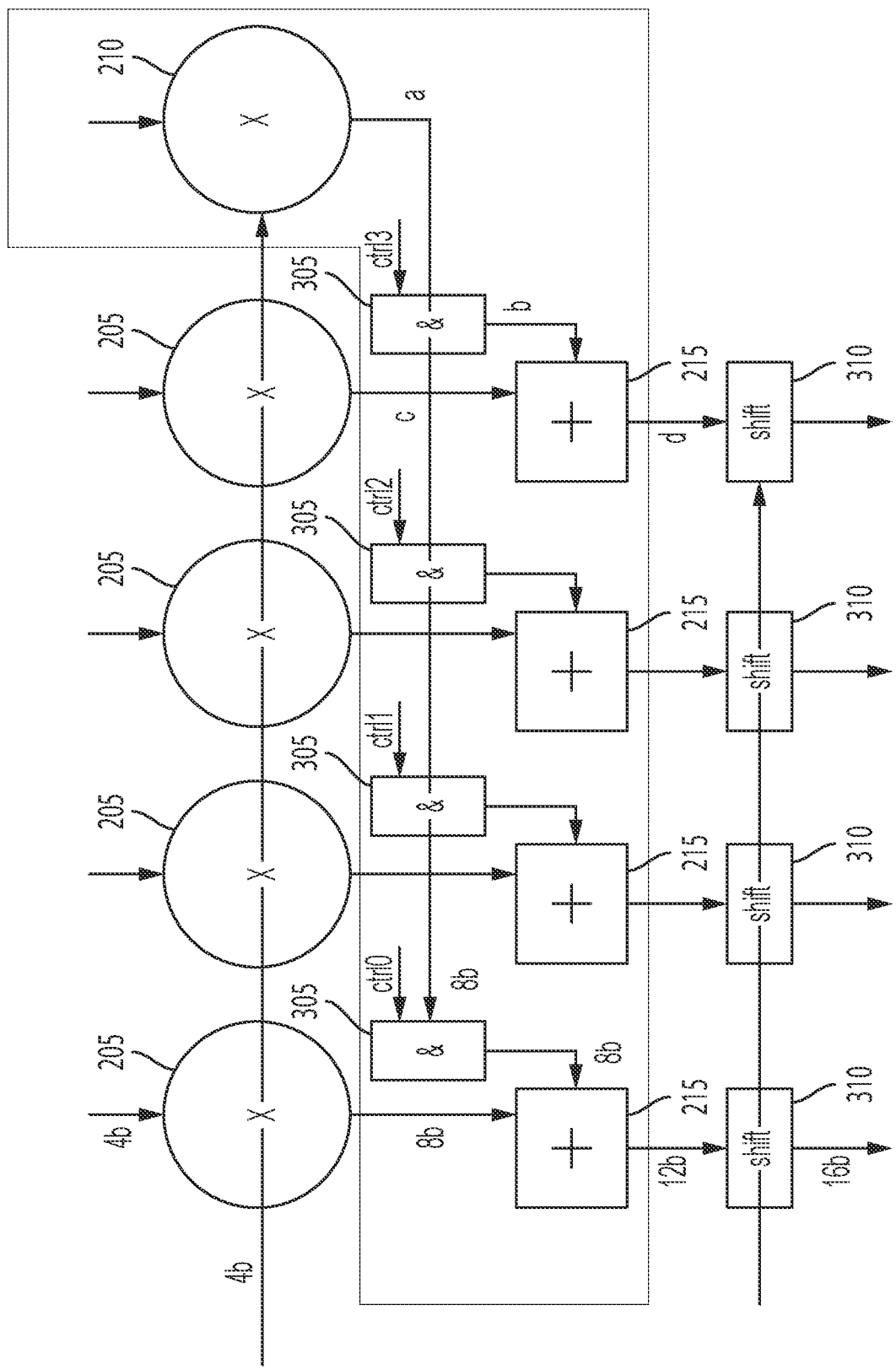
FIG. 3A is a block diagram of a portion of a neural network processor, according to an embodiment of the present disclosure.

FIG. 3A shows, in greater detail, a circuit that may be used to add the second partial product to those first partial products for which the index bit is one. Like FIG. 2A, FIG. 3A shows only four of the eight standard multipliers 205, for ease of illustration. Each of the adders 215 has a first input, connected to an output of a respective one of the standard multipliers 205, for receiving a first partial product, and a second input for receiving the second partial product, if the most significant nibble of the weight is nonzero. The second partial product ("a" in FIG. 3B) is gated, in a respective AND gate array 305, by the corresponding outlier bit (labeled "ctrl0" through "ctrl3" in FIG. 3A), so that if the outlier bit is set, the second input of the adder 215 receives the second partial product, and if the outlier bit is not set, the second input of the adder 215 receives zero. A shifter 310 (which may be implemented with multiplexers) is configurable to shift the output of each adder by 0, 4, or 8 bits to the left (to account for one or both of the weight nibble or the activation nibble being a most significant nibble) before being added to other adder outputs.

Figure 3B:
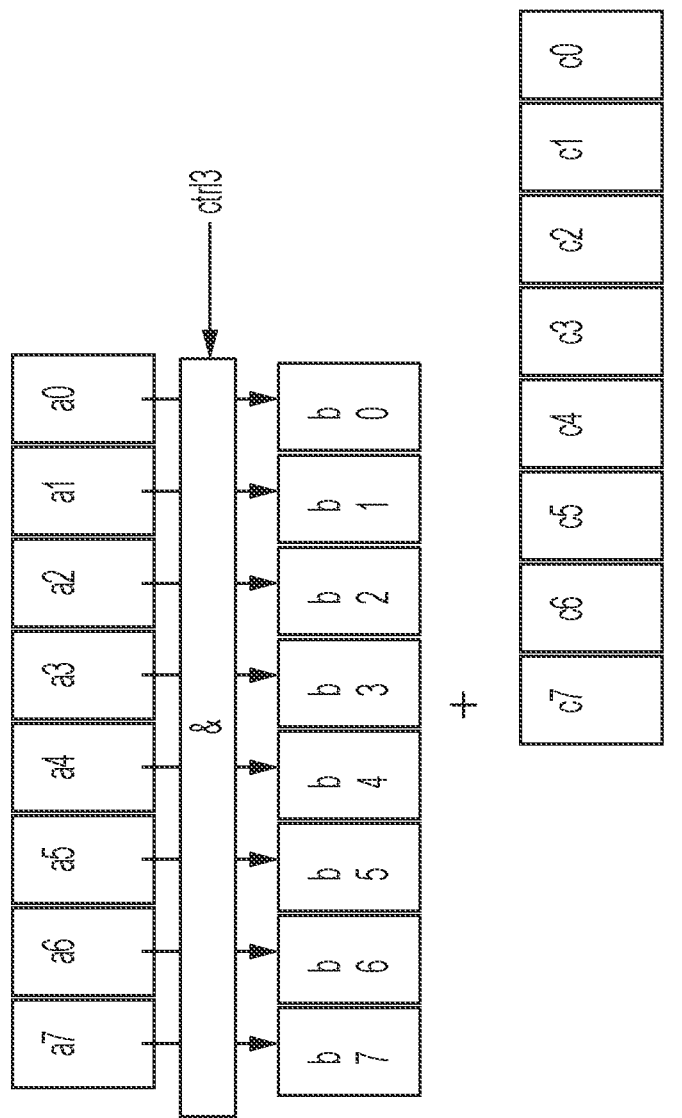
FIG. 3B is a hybrid data format and data flow diagram, according to an embodiment of the present disclosure.

FIG. 3B shows the details of the gating and offset addition, in some embodiments, for the fourth weight (the corresponding circuits and operations for the other weights may be the same). The bits a0 . . . a7 are the output of the outlier multiplier 210; they are gated by the outlier bit ctrl3 to form the bits received at the second input of the fourth adder 215. An offset addition is performed in the fourth adder 215 (which may be referred to as an "offset adder"), with the 8 bits of the second partial product being left shifted by four bits before addition is performed. A circuit for performing the offset addition shown may include pass-throughs (wires) for the four least significant bits (c0 . . . c3) of the first partial product (which are unchanged by the offset addition), a four-bit adder for adding (i) the four least significant bits of the (gated) second partial product and (ii) the four most significant bits of the first partial product (the four bit adder including one half adder and three full adders), a half adder for adding the carry from the four-bit adder to the fifth bit (b4, the least significant bit of the most significant nibble) of the second partial product, and three pass-throughs (wires) for the three most significant bits of the second partial product.

Although some examples are presented herein for an embodiment with 8-bit weights, 8-bit activation values, a weight buffer that is four weights wide, and weights and activations that may be processed one nibble at a time, it will be understood that these parameters and other like parameters in the present disclosure are used only as a specific concrete example for ease of explanation, and that any of these parameters may be changed. As such, the size of a weight may be a "word", for example, and the size of a portion of a weight may be a "sub-word", with, in the embodiment of FIGS. 2A-3B, the size of the word being one byte and the size of a sub-word being one nibble. In other embodiments, a word may be 12 bits and a sub-word six bits, for example, or a word may be 16 bits, and a sub-word may be one byte.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "rectangle" includes a square as a special case, i.e., a square is an example of a rectangle, and the term "rectangular" encompasses the adjective "square". As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The terms "processing circuit" and "means for processing" are used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, the term "array" refers to an ordered set of numbers regardless of how stored (e.g., whether stored in consecutive memory locations, or in a linked list). As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for performing sets of multiplications in a manner that accommodates outlier values have been specifically described and illustrated herein, many modifications and variations will be apparent to those skilled in the art. Accordingly, it is to be understood that a system and method for performing sets of multiplications in a manner that accommodates outlier values constructed according to principles of this disclosure may be embodied other than as specifically described herein. The invention is also defined in the following claims, and equivalents thereof.

What is claimed is:

1. A method, comprising:
forming a first set of products, each product of the first set of products being a product of a first activation value and a respective weight of a first plurality of weights, each of the weights of the first plurality of weights including a least significant sub-word and a most significant sub-word;
the forming of the first set of products comprising:
for each product of the first set of products,
when the most significant sub-word of a first weight of the first plurality of weights is nonzero:
multiplying, in a first multiplier of a first block of a multiplier accumulator (MAC) array, the first activation value and the least significant sub-word of the first weight to form a first partial product;
multiplying, in a third multiplier of the first block of the MAC array, the first activation value and the most significant sub-word of the first weight to form a second partial product; and
adding the first partial product and the second partial product; and
when the most significant sub-word of a second weight of the first plurality of weights is zero:
multiplying, in a second multiplier of the first block of the MAC array, the first activation value and the least significant sub-word of the second weight,
wherein the third multiplier is a different type of multiplier from the first multiplier and the second multiplier.

2. The method of claim 1, wherein the adding of the first partial product and the second partial product comprises performing an offset addition of the first partial product and the second partial product.

3. The method of claim 1, wherein:
the most significant sub-word of a third weight of the first plurality of weights is equal to the most significant sub-word of the first weight; and
the forming of the first set of products further comprises:
multiplying, in a fourth multiplier, the first activation value and the least significant sub-word of the third weight to form a third partial product; and
adding the third partial product and the second partial product.

4. The method of claim 3, wherein:
the adding of the first partial product and the second partial product comprises adding the first partial product and the second partial product in response to a first bit of an index word, for the first plurality of weights, being set;
the first bit corresponds to the first weight;
the adding the third partial product and the second partial product comprises adding the third partial product and the second partial product in response to a second bit of the index word being set; and
the second bit corresponds to the third weight.

5. The method of claim 1, further comprising forming a second set of products, each product of the second set of products being a product of a second activation value and a second plurality of weights, each of the weights of the second plurality of weights including a least significant sub-word and a most significant sub-word;
the most significant sub-word of each of the second plurality of weights being equal to a first nonzero value,
the forming of the second set of products comprising:
multiplying, in the first multiplier, the second activation value and the least significant sub-word of a first weight of the second plurality of weights to form a third partial product;
multiplying, in the second multiplier, the second activation value and the least significant sub-word of a second weight of the second plurality of weights to form a fourth partial product;
multiplying, in the third multiplier, the first activation value and the first nonzero value to form a fifth partial product;
adding the third partial product and the fifth partial product; and
adding the fourth partial product and the fifth partial product.

6. The method of claim 1, further comprising:
determining that a first dense format flag, for the first plurality of weights, is not set,
wherein the forming of the first set of products comprises forming the first set of products in response to the first dense format flag being not set.

7. The method of claim 6, further comprising determining that a second dense format flag, for a second plurality of weights, is set, and
in response to the second dense format flag being set, forming a second set of products, each product of the second set of products being a product of a second activation value and a respective weight of the second plurality of weights, each of the weights of the second plurality of weights including a least significant sub-word and a most significant sub-word, the forming of the second set of products comprising:
multiplying, in the first multiplier, the second activation value and the least significant sub-word of a first weight of the second plurality of weights to form a third partial product;
multiplying, in the first multiplier, the second activation value and the most significant sub-word of the first weight of the second plurality of weights to form a fourth partial product; and
adding the third partial product and the fourth partial product.

8. The method of claim 1, wherein:
the least significant sub-word of the first weight consists of four bits, and
the most significant sub-word of the first weight consists of four bits.

9. The method of claim 8, wherein the first multiplier is a four bit by four bit multiplier.

10. A system, comprising:
a processing circuit comprising:
a first multiplier,
a second multiplier, and
a third multiplier,
the processing circuit being configured to form a first set of products, each product of the first set of products being a product of a first activation value and a respective weight of a first plurality of weights,
each of the weights of the first plurality of weights including a least significant sub-word and a most significant sub-word;
the forming of the first set of products comprising:
for each product of the first set of products,
when the most significant sub-word of a first weight of the first plurality of weights is nonzero:
multiplying, in the first multiplier of a first block of a multiplier accumulator (MAC) array, the first activation value and the least significant sub-word of the first weight to form a first partial product;
multiplying, in the third multiplier of the first block of the MAC array, the first activation value and the most significant sub-word of the first weight to form a second partial product; and
adding the first partial product and the second partial product; and
when the most significant sub-word of a second weight of the first plurality of weights is zero:
multiplying, in a second multiplier of the first block of the MAC array, the first activation value and the least significant sub-word of the second weight,
wherein the third multiplier is a different type of multiplier from the first multiplier and the second multiplier.

11. The system of claim 10, wherein the adding of the first partial product and the second partial product comprises performing an offset addition of the first partial product and the second partial product.

12. The system of claim 10, wherein:
the most significant sub-word of a third weight of the first plurality of weights is equal to the most significant sub-word of the first weight; and
the forming of the first set of products further comprises:
multiplying, in a fourth multiplier, the first activation value and the least significant sub-word of the third weight to form a third partial product; and
adding the third partial product and the second partial product.

13. The system of claim 12, wherein:
the adding of the first partial product and the second partial product comprises adding the first partial product and the second partial product in response to a first bit of an index word, for the first plurality of weights, being set;
the first bit corresponds to the first weight;
the adding the third partial product and the second partial product comprises adding the third partial product and the second partial product in response to a second bit of the index word being set; and
the second bit corresponds to the third weight.

14. The system of claim 10, wherein the processing circuit is further configured to form a second set of products, each product of the second set of products being a product of a second activation value and a second plurality of weights,
each of the weights of the second plurality of weights including a least significant sub-word and a most significant sub-word;
the most significant sub-word of each of the second plurality of weights being equal to a first nonzero value,
the forming of the second set of products comprising:
multiplying, in the first multiplier, the second activation value and the least significant sub-word of a first weight of the second plurality of weights to form a third partial product;
multiplying, in the second multiplier, the second activation value and the least significant sub-word of a second weight of the second plurality of weights to form a fourth partial product;

multiplying, in the third multiplier, the first activation value and the first nonzero value to form a fifth partial product;

adding the third partial product and the fifth partial product; and adding the fourth partial product and the fifth partial product.

15. The system of claim 10, wherein the processing circuit is further configured to:

determine that a first dense format flag, for the first plurality of weights, is not set, wherein the forming of the first set of products comprises forming the first set of products in response to the first dense format flag being not set.

16. The system of claim 15, wherein the processing circuit is further configured to determine that a second dense format flag, for a second plurality of weights, is set, and in response to the second dense format flag being set, form a second set of products, each product of the second set of products being a product of a second activation value and a respective weight of the second plurality of weights, each of the weights of the second plurality of weights including a least significant sub-word and a most significant sub-word, the forming of the second set of products comprising:

multiplying, in the first multiplier, the second activation value and the least significant sub-word of a first weight of the second plurality of weights to form a third partial product;

multiplying, in the first multiplier, the second activation value and the most significant sub-word of the first weight of the second plurality of weights to form a fourth partial product; and adding the third partial product and the fourth partial product.

17. The system of claim 10, wherein:

the least significant sub-word of the first weight consists of four bits, and the most significant sub-word of the first weight consists of four bits.

18. The system of claim 17, wherein the first multiplier is a four bit by four bit multiplier.

19. A system, comprising:

means for processing, comprising:
a first multiplier,
a second multiplier, and
a third multiplier, the means for processing being configured to form a first set of products, each product of the first set of products being a product of a first activation value and a respective weight of a first plurality of weights, each of the weights of the first plurality of weights including a least significant sub-word and a most significant sub-word;

the forming of the first set of products comprising:
for each product of the first set of products,
when the most significant sub-word of a first weight of the first plurality of weights is nonzero:

multiplying, in the first multiplier of a first block of a multiplier accumulator (MAC) array, the first activation value and the least significant sub-word of the first weight to form a first partial product;

multiplying, in the third multiplier of the first block of the MAC array, the first activation value and the most significant sub-word of the first weight to form a second partial product; and adding the first partial product and the second partial product; and when the most significant sub-word of a second weight of the first plurality of weights is zero:

multiplying, in a second multiplier of the first block of the MAC array, the first activation value and the least significant sub-word of the second weight, wherein the third multiplier is a different type of multiplier from the first multiplier and the second multiplier.

20. The system of claim 19, wherein the adding of the first partial product and the second partial product comprises performing an offset addition of the first partial product and the second partial product.

* * * * *